Feb. 21, 1939.  J. L. SCHUELER  2,148,380
WOVEN WIRE FENCING
Filed April 2, 1937
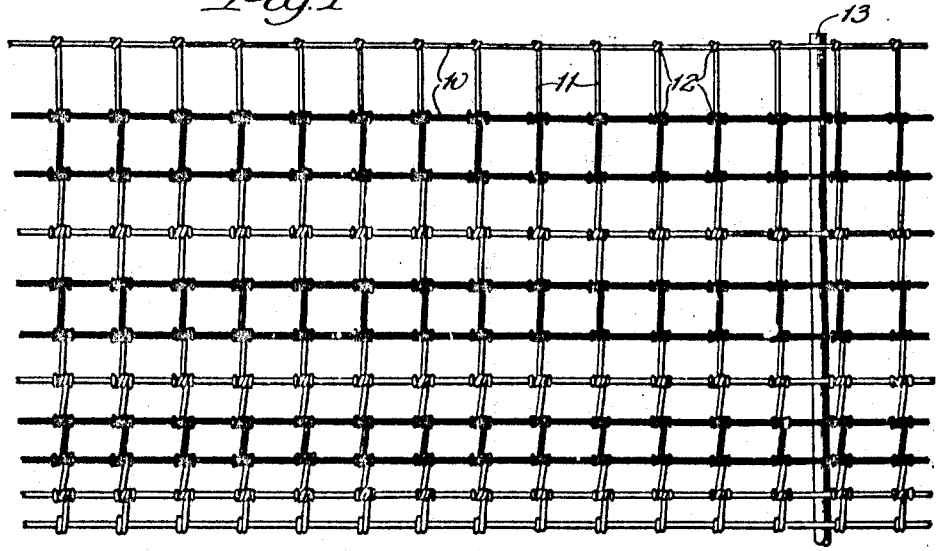
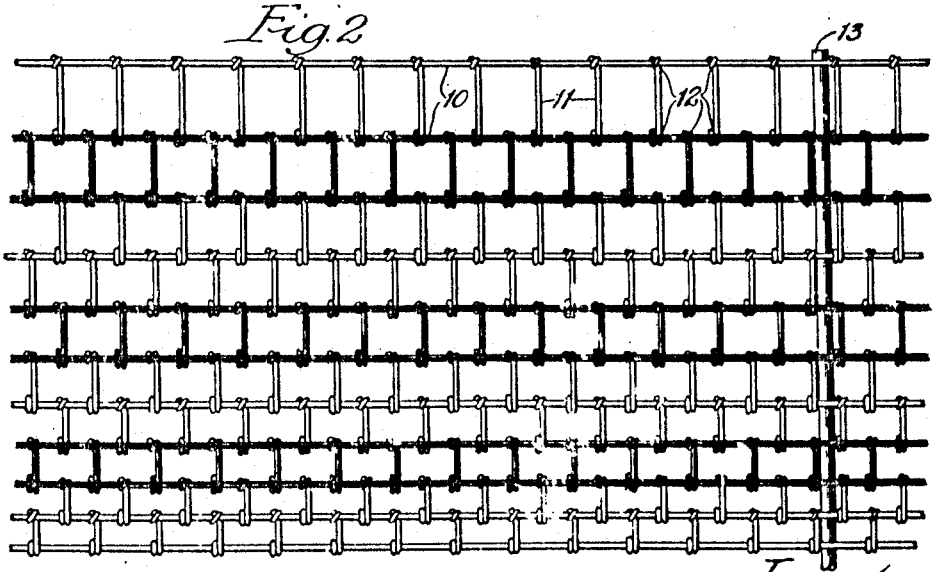
Inventor:
Julian L. Schueler Patented Feb. 21, 1939

2,148,380

UNITED STATES PATENT OFFICE 2,148,380

WOVEN WIRE FENCING

Julian L. Schueler, Kokomo, Ind., assignor to Continental Steel Corporation, Kokomo, Ind., a corporation of Indiana Application April 2, 1937, Serial No. 134,499

6 Claims. (Cl. 41—10)

Woven wire fencing, as commonly constructed and used for the purpose of preventing the escape of cattle or other animals, is formed of longitudinal strand wires which are ordinarily spaced several inches apart, in conjunction with vertical stay wires which are knotted or intercoiled with the strand wires, giving to the fence as a whole a coarse mesh formation. Such fences are commonly constructed from galvanized wire, which is usually of a dull greyish color and is not easily visible to the cattle in subdued light or when viewed against a dull grey sky. As a result of this circumstance, cattle frequently run into such fences, unaware of the fact that a barrier is interposed, and in this way may injure the fence or occasionally injure themselves where such collisions occur.

To provide a warning to approaching animals, it has been the practice to swing elongated warning slats or boards of wood or metal horizontally between the longitudinal strands of a wire fence, or to affix between the strands relatively wide vertically extending boards or tags to serve as a visible warning against possible injury.

The object of the present invention is to overcome the tendency of animals to ignore or overlook the presence of an all wire fence, by so painting or otherwise contrasting certain of the strand and stay wires as to conspicuously display the solid appearance of a continuous barrier in the form of a board fence or the like, so that the animals will be restrained or prevented from inadvertently charging into the fence.

It is not the intention to merely paint or color the entire fence with a more conspicuous color than that afforded by the galvanized wire, but to simulate or suggest the solid appearance of continuous boards or rails at spaced intervals above one another, thereby particularly directing attention to these portions of the fence which by contrast of color are conspicuously displayed in a manner to suggest solidity of structure by accentuating certain horizontal lines in contrast with the general intermesh of the fence as a whole, which without the features of the present invention frequently blends inconspicuously into the background of foliage or the grey color of the sky so as to be unobserved by animals, particularly in foggy or rainy weather, or in partial twilight.

Further objects and details of the invention will appear from a description thereof in conjunction with the accompanying drawing, wherein,—

Figure 1 represents a woven wire fence having aligned stay wires and displaying the features of the present invention; and Fig. 2 is a view of a similar fence in which alternate stay wires stand in staggered relation to one another.

The fence as shown in Fig. 1 comprises a plurality of spaced strand wires 10 and aligned cross stay wires 11 which are connected by knots or coils 12 with the strand wires.

As shown, the stay wire sections stand in vertical aligned relation from top to bottom of the fence, giving to the fence as a whole a checkerboard pattern, but the present invention is equally applicable to fences in which the alternate stay wire sections stand in staggered relation to one another as in Fig. 2. The fence as shown is strung upon fence posts 13 and stands at an elevation of about four and a half feet.

In order to create the illusion of a board or other solid fence affording a conspicuous barrier against escape, the third and fourth strand wires with the intervening stay wire sections, and likewise the sixth and seventh, and the ninth and tenth strand wires with their intervening stay wire sections, are painted or otherwise colored in such a way as to afford a conspicuous contrast to the remainder of the fence and to simulate the solid appearance of continuous boarding from end to end of the fence, and when thus colored these portions of the fence structure will stand out in sharp contrast to the sky or the surrounding landscape and will be easily visible at considerable distances, and create the impression of continuously extending board or other solid enclosure, which to a very marked degree reduces the number of accidents occasioned by animals charging into the fence while unaware of its presence, or of the fact that a fairly rigid and substantial barrier is present.

It is preferred to space each pair of colored strand wires at a greater distance than the width of the space between the constituents composing the pair, so that the resulting effect of a conventional board fence will be more conspicuously suggested, and this method of spacing also serves better to direct attention to the conspicuously colored portions of the fence and to emphasize the contrast with the remainder of the fence structure. This effect would be lost or defeated if the entire fence were merely colored or painted, since the present invention is intended rather to direct attention to certain portions only of the fence structure in order to create the illusion previously described.

Repeated experiments have shown that a coating of yellow affords particularly good results, since the effect of contrast with the dull zinc coating is highly accentuated, although other contrasting colors may be employed with similar results. It is of course desirable to paint or color these portions of the fence in such a way as to accentuate the contrast not only with the remainder of the fence but with the features of the surrounding landscape, so that the fence as a whole may not appear to blend into the broken surface of the landscape but to stand in sharp contrast thereto in order to secure the best results.

By also painting the stay wire sections which intervene between adjacent colored strand wires, the effect of solidity of continuous boarding is emphasized, so that the attention of the cattle will be quickly arrested and the presence of a continuous barrier brought to notice.

Although woven wire fencing of the character particularly illustrated and described is peculiarly adapted to the requirements of the present invention, it will be understood that the particular type of mesh may be varied or modified, and that the principles of the invention may be utilized in connection with such fencing as chain link fencing, ornamental fencing, and diamond mesh fencing or the like.

I claim:

1. A woven wire fence consisting of a plurality of longitudinal spaced strand wires and intervening stay wire sections, two or more vertically spaced pairs of strand wires and the interposed stay wire sections being colored in sharp contrast to the remainder of the fence to simulate the solid appearance of continuous lines of boarding separated vertically from one another.

2. A woven wire fence consisting of a plurality of longitudinal spaced strand wires and intervening stay wire sections, two or more vertically spaced pairs of strand wires being colored in sharp contrast to the remainder of the fence to simulate the solid appearance of continuous lines of boarding, the constituent strand wires of each conspicuously colored pair being closer together than the vertical space intervening between such pairs of strand wires.

3. A woven wire fencing providing a mesh having spaced portions thereof colored in contrast to the color of the remaining portions to display the effect of longitudinally extending parallel spaced continuous stripes simulating the solid effect of boarding separated vertically by less conspicuous uncolored portions.

4. A woven wire fencing providing a mesh having spaced portions thereof vividly colored in contrast to the dull color of the remaining portions to display the effect of longitudinally extending parallel spaced continuous stripes simulating the solid effect of boarding separated vertically by less conspicuous uncolored portions.

5. A woven wire fencing providing a mesh having spaced portions thereof vividly colored in contrast to the dull color of the remaining portions to display the effect of longitudinally extending parallel spaced continuous stripes simulating the solid effect of boarding separated by less conspicuous uncolored portions of greater width than the striped portions.

6. A woven wire fence consisting of a plurality of longitudinal spaced strand wires and intervening stay wire sections, two or more pairs of strand wires and the interposed stay wire sections being colored in sharp contrast to the remainder of the fence to simulate the solid appearance of continuous lines of boarding, the constituent strand wires of each conspicuously colored pair being closer together than the space intervening between such pairs of strand wires.

JULIAN L. SCHUELER.